United States Patent [19]

Genz

[11] Patent Number: 4,603,244
[45] Date of Patent: Jul. 29, 1986

[54] FUEL FILTER JACKET

[76] Inventor: Marlin J. Genz, P.O. Box 17, Clitherall, Minn. 56524

[21] Appl. No.: 632,283

[22] Filed: Jul. 19, 1984

[51] Int. Cl.⁴ .............................................. B60L 1/02
[52] U.S. Cl. .................... 219/205; 219/208; 219/438; 123/196 A
[58] Field of Search ............... 219/205, 206, 207, 438, 219/439, 404, 407; 123/557, 543, 545, 196 A, 196 AB

[56] References Cited

U.S. PATENT DOCUMENTS

| | | | |
|---|---|---|---|
| 2,006,059 | 6/1935 | Rudorff | 219/439 |
| 2,429,321 | 10/1947 | La Brecque | 210/183 |
| 2,745,552 | 5/1956 | Bruggeman et al. | 210/122.5 |
| 3,564,199 | 2/1971 | Blaha | 219/205 X |
| 3,935,901 | 2/1976 | Virgil | 219/205 X |
| 4,091,265 | 5/1978 | Richards et al. | 219/501 |
| 4,191,524 | 3/1980 | Thorn | 431/208 |
| 4,372,260 | 2/1983 | Baker | 123/142.5 E |
| 4,387,691 | 6/1983 | Marcoux et al. | 123/557 |
| 4,404,949 | 9/1983 | Bell | 123/557 |
| 4,428,351 | 1/1984 | Davis | 123/557 |
| 4,442,819 | 4/1984 | Veach | 123/557 |
| 4,498,446 | 2/1985 | Judson | 123/557 |

*Primary Examiner*—C. L. Albritton
*Assistant Examiner*—M. M. Lateef
*Attorney, Agent, or Firm*—Burd, Bartz & Gutenkauf

[57] ABSTRACT

A jacket for maintaining or adding heat to a diesel fuel-type fuel filter as fuel passes through the filter in order to decrease the incidence of congealing and avoid problems associated with condensation. The jacket includes a sleeve of thermally insulative material closely surrounding the fuel filter housing. A mounting ring has a base embedded in the jacket and mounting fingers extended axially from the upper edge of the sleeve. The mounting fingers are bendable over the top wall of the fuel filter element housing. Heating means embedded in the sleeve selectively provide heat to the fuel filter housing for transfer to passing diesel-type fuel.

16 Claims, 10 Drawing Figures

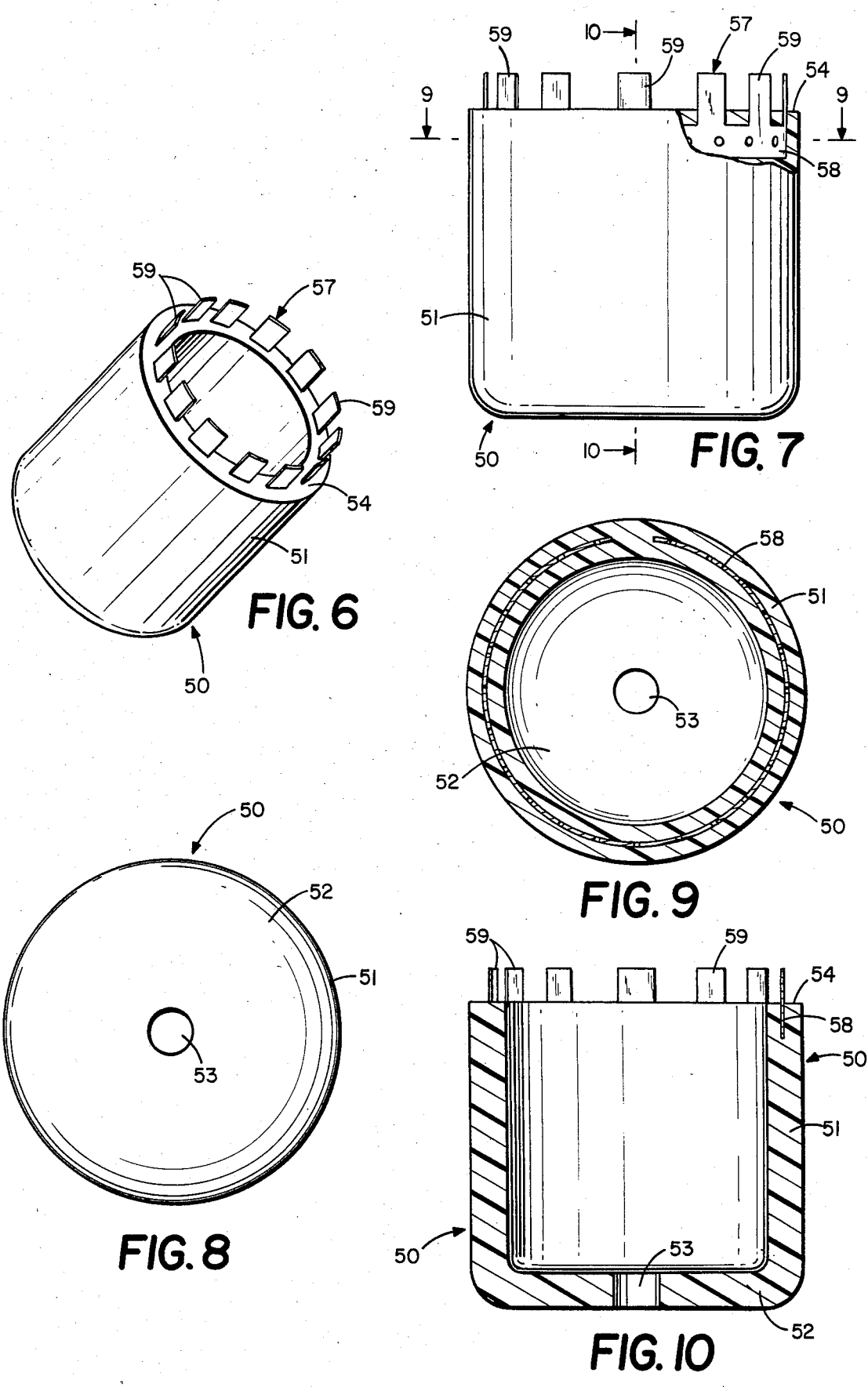

FUEL FILTER JACKET

BACKGROUND OF THE INVENTION

Diesel fuel for use with internal combustion engines is popular for reasons of availability, price and efficiency. Diesel engines are well known for durability and longevity. However, the use of such fuel is not problem free, particularly in colder climates. This is due at least in part to the presence of paraffin, wax and water in the fuel in varying degrees depending on the geographical source of the fuel and the amount of refinement. At approximately 20° F., the paraffin can congeal and block the fuel filter with resultant engine starvation even after a period of engine operation. Water condensation can also cause engine problems.

In attempts to solve this problem, various devices have been used to heat the fuel prior to entry into or upon entry into the fuel filter to avoid congealing and permit the passage of the fuel to the fuel injectors. For example, some heaters are provided to preheat the fuel even while the engine is at rest in order to facilitate starting. Another device is interposed between the fuel filter mount and the fuel filter to heat the fuel as it passes into and out of the fuel filter. Many other devices have been proposed and are available for heating the fuel.

SUMMARY OF THE INVENTION

The invention relates to a device for heating or maintaining the temperature of diesel-type fuel as it passes through the fuel filter in order to avoid problems associated with congealing and condensation. A sheath or jacket has a sleeve to closely cover the fluid filter housing when installed on the fluid filter mount. The sleeve is formed of a thermal insulative material. A mounting ring is partially embedded in the sleeve and has fingers extending outwardly of the sleeve in an axial direction. The fingers are bendable about a portion of the filter housing in order to maintain the sleeve in place. A heating element can also be embedded in the side walls of the sleeve in order to selectively apply heat to the sleeve to be transmitted through the inner wall of the sleeve to the filter housing to supply heat to passing fuel. The heating element can be thermostatically operated or it can be manually switched on and off.

IN THE DRAWINGS

FIG. 6 is a perspective view of a modification of a fuel filter jacket of the invention;

FIG. 7 is a side elevational view of the fuel filter jacket of FIG. 6;

FIG. 8 is an enlarged bottom view of the fuel jacket of FIG. 6;

FIG. 9 is a sectional view of the fuel filter and jacket of FIG. 7 taken along the line 9—9 thereof; and FIG. 10 is another sectional view of the fuel filter and jacket of FIG. 7 taken along the line 10—10 thereof.

DESCRIPTION OF PREFERRED EMBODIMENTS

Figure 1:
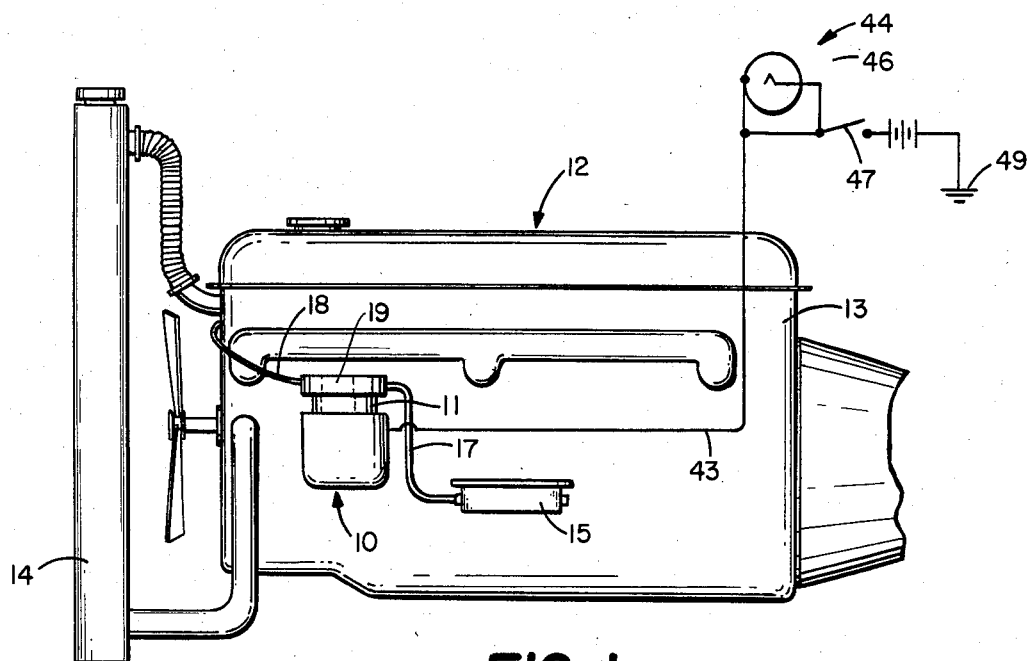
FIG. 1 is a diagrammatic view of an internal combustion diesel engine equipped with a fuel filter jacket and heater according to the invention.

Referring to the drawings, there is shown in FIG. 1 a fuel filter jacket 10 installed on a fuel filter 11 connected in operative relationship to a diesel internal combustion engine 12 of the type having a cylinder block 13, a cooling radiator 14 and a fuel pump 15 mounted on the block 13. A fuel filter inlet line 17 delivers fuel from the fuel pump 15 to fuel filter 11 where it is filtered preparatory to passing through fuel outlet line 18 to fuel injectors (not shown) mounted on engine block 13 for discharging fuel into combustion chambers. Engine 12 can be of the type that burns hydrocarbon fuel, such as diesel fuel, whereby at times it is important that the fuel be maintained at a certain minimum temperature prior to introduction into the fuel filter 11 or fuel injectors.

Figure 2:
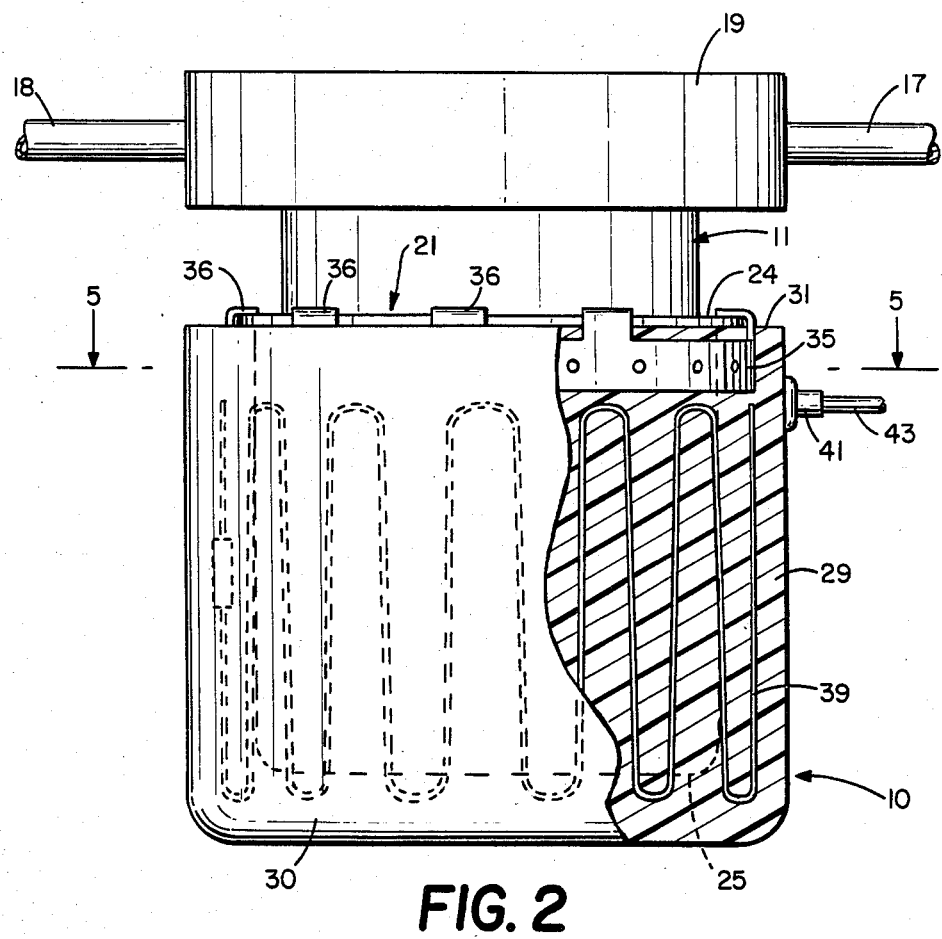
FIG. 2 is an enlarged side elevational view of the fuel filter and jacket of FIG. 1 with portions broken away for purposes of illustration.
Figure 3:
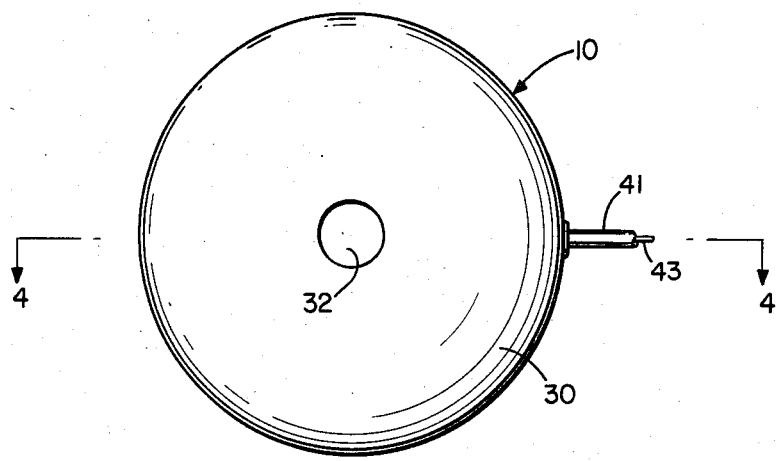
FIG. 3 is a reduced bottom plan view of the fuel filter and jacket of FIG. 2.
Figure 4:
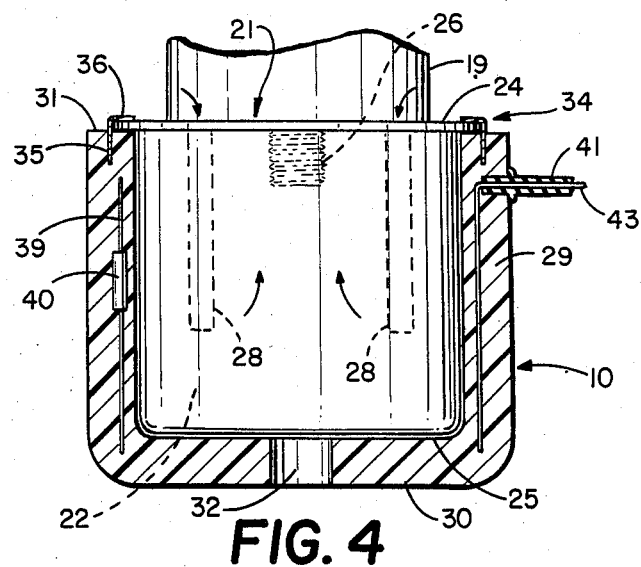
FIG. 4 is a sectional view of the fuel filter and jacket of FIG. 3 taken along the line 4—4 thereof.
Figure 5:
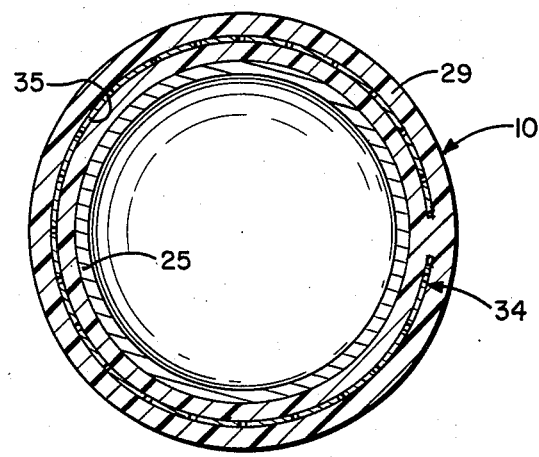
FIG. 5 is a reduced sectional view of the fuel filter and jacket of FIG. 2 taken along the line 2—2 thereof.

As shown in FIGS. 2 and 4, fuel filter assembly 11 includes a fuel filter mount 19 and a removable, replaceable fuel filter element 21 carrying filtering media 22. Filter element 21 has a top wall 24 and a cylindrical cup-shaped housing 25 containing filter element or media 22 (see FIG. 4). Top wall 24 has a central threaded opening which receives an exteriorly threaded tubular fitting 26 connected to the bottom of filter mount 19. A pair of inlet tubes 28 extend downwardly from the top wall 24 and register with suitable openings in the bottom of filter mount 19 when top wall 24 is fully secured on fitting 26. Fuel traveling through the inlet 17 passes through the fuel filter mount 19 down through the inlet tubes 28. The fuel passes through the filtering media 22 then back through the central opening of fitting 26, which is connected to the fuel outlet line 18.

Fuel filter sheath or jacket 10 closely surrounds housing 25 of filter element 21. Jacket 10 includes a side wall forming a cylindrical sleeve 29 connected to a bottom wall 30. Sleeve 29 has an inside diameter to closely correspond to the outside diameter of the housing 25 of filter element 21 in order to fit over the housing 25 in snug relationship. The inside height of sleeve 29 or the distance between the inside surface of bottom wall 30 and the upper edge 31 of sleeve 29 generally corresponds to the side wall length of housing 25 of filter element 21. Sleeve 29 and bottom wall 30 are formed of a one piece, resilient, and heat insulative material, such as foam rubber, foam plastic and the like. A drain opening 32 is provided in bottom wall 30 to permit passage of condensate or other fluid products to the atmosphere. The inside and outside of sleeve 29 can be coated with flexible rubber to seal the surfaces of the foamed sleeve.

A mounting ring 34 is integral with sleeve 29 near the upper edge 31 to secure jacket 10 to filter element 21. Mounting ring 34 includes a base comprised as a cylindrical rim or band 35 embedded in sleeve 29 just beneath the upper edge 31 and preferably having a diameter just slightly larger than the diameter of the top wall 24 of filter element 21. Band 35 is split to allow the sleeve 29 to expand when it is forced on filter housing 25. Band 35 has a number of holes to allow the material of the sleeve to fix the band in the end of the sleeve. A plurality of vertical fingers 36 extend upward from band 35 and outwardly of the top edge 31 of sleeve 29. Fingers 36 can be integrally formed with the band 35 and are of a bendable metal. Fingers are generally flat tabs circumferentially spaced from each other. The space between adjacent tabs is generally equal. Fingers 36 are adapted to be bent around the upper edge of top wall 24 of filter element 21. In the configuration with jacket 10 installed on filter element 21, fingers 36 extend upward from band 25 beyond upper edge 31 of jacket 29 and are bent inwardly over the top edge of top wall 24 to secure jacket 10 on filter housing 25.

Jacket 10 has heating means to supply heat to filter element 21 to prevent coagulating of passing fuel which might otherwise block passage through filtering media 22. A heating element or wire 39 is embedded in sleeve 29 and forms a closed loop circumferentially around the side wall. Wire 39 is located adjacent the inner surface of sleeve 29. Element 39 is arranged in a series of side-by-side open or sinuate loops around sleeve 29. Element 39 is arranged is such a loop pattern in order to evenly distribute heat about the side wall 29. A thermal couple 40 disposed in element 39 regulates the maximum temperature achievable by the heating element. An electrical fitting 41 leads element 39 into and out of sleeve 29. A lead 43 extends to exterior controls 44 including thermostatic control 46, on-off switch 47 and power supply 49 which can be the usual vehicle battery.

In use of jacket 10, sleeve 29 is slipped over the housing 25 of the fuel filter element installed on fuel filter mount 19 with the fingers 36 initially in a straight or unbent condition. When the sleeve 29 and bottom wall 30 are properly positioned, the fingers 36 are bent over the top wall 24 of the fuel filter element. This serves to securely hold the jacket 10 in place. The heating element is energized to provide heat according to ambient conditions such that passing fuel will not congeal in the fuel filter element.

According to the form of the invention shown in FIGS. 7–10, there is provided a fuel filter jacket 50 for purposes of insulating a fuel filter element and conserving the heat retained in passing fuel in order to prevent congealing thereof and blockage of the fuel filter. Jacket 50 has a side wall forming a cylindrical sleeve 51 with an inside diameter sufficient to snugly accommodate the outside diameter of the housing of a fuel filter element. The lower portion of sleeve 51 is closed by a bottom wall 52 which can have a central opening 53 for discharge of condensate or other fluids. Sleeve 51 and bottom 52 are formed of a thermally insulative material, such as foam rubber, foam plastic, and the like. The inside height of sleeve 51 between the upper surface of bottom wall 52 and the upper edge 55 generally corresponds to the height of the side wall of the housing of a fuel filter element. The inside and outside surfaces of sleeve 51 can be coated with flexible rubber to seal the surfaces of the foamed sleeve.

A mounting split ring or base 57 associated with the upper portion of sleeve 51 includes a circular rim or band 58 embedded in the sleeve 51 just beneath the upper edge 54. The band 58 is split to allow sleeve 51 to expand and fit over the filter housing. A plurality of upstanding bendable fingers 59 extend upwardly from band 58 and outwardly of the top edge 54. Fingers 59 are adapted to be bended over the end wall of a fuel filter element.

In use, sleeve 51 is slipped over the outer wall or housing of a fuel filter element to the extent where the bottom of the element is proximate bottom wall 52 and the top of the element more or less aligns the upper edge 54 of sleeve 51. At that point, fingers 59 are bent over the top of the element as previously described to secure the jacket 50 in place. When so in place, the jacket 50 is operative to prevent heat loss from the fuel filter element to the surrounding atmosphere to assist in maintaining the heat in the passing fuel and prevent congealing of it.

The embodiments of the invention in which an exclusive property or privilege is claimed are defined as follows:

1. A jacket for covering a fuel filter element of the type having a cylindrical element housing covered by a top wall and having a bottom wall, comprising:

a cylindrical sleeve formed of thermally insulative material, said sleeve having a height generally corresponding to the height of the housing of a fuel filter element and an internal diameter generally corresponding to the outside diameter of a fuel filter element housing, an upper edge locatable proximate the top wall of the fuel filter element when the sleeve is positioned in covering relationship to the housing, and a bottom wall in close relationship to the bottom wall of the filter element; and mounting ring means coactable between the top and bottom walls of the filter element to hold the sleeve in place including a base embedded in the sleeve a short distance beneath the top edge, and a plurality of fingers extended from the base outward of the top edge of the sleeve, said fingers being bendable over the top wall of a filter element when the sleeve is positioned in covering relationship to the filter element housing whereby the filter element is positioned between the fingers of the mounting ring means and the bottom wall of the sleeve to hold the sleeve in place.

2. The jacket of claim 1 wherein: said bottom wall has a drainage opening.

3. The jacket of claim 1 wherein: said mounting ring means base is comprised as a cylindrical split rim embedded in and coaxial with the sleeve.

4. The jacket of claim 3 wherein: said rim is embedded in the sleeve proximate the upper edge.

5. The jacket of claim 4 wherein: said rim has a diameter slightly larger than the diameter of the top wall of the filter element housing.

6. The jacket of claim 5 wherein: said fingers are equally, circumferentially spaced about the rim.

7. The jacket of claim 3 including: heater means located within the sleeve for heating the fuel filter and fuel therein.

8. A jacket for covering a fuel filter element of the type having a fuel filter element housing with a housing top wall, comprising:

a sleeve formed of thermally insulative material and having a height generally corresponding to the side wall height of the housing of a fuel filter element, and an interior transverse dimension generally corresponding to the exterior transverse dimension of a fuel filter element housing, and an upper edge locatable proximate the top wall of the fuel element housing when the sleeve is positioned in covering relationship to the housing;

mounting ring means for mounting the sleeve to the fuel filter element, including a base embedded in the sleeve a short distance from the top edge and a plurality of elongate fingers extended from the base outwardly of the top edge of the sleeve, said fingers being bendable over the top wall of the housing to secure the sleeve; and heating means embedded in the sleeve for heating the fuel filter element housing.

9. The jacket of claim 8 wherein: said heating means includes a sinuate loop heating element embedded in the sleeve extending circumferentially around the sleeve.

10. The jacket of claim 9 wherein: said heating element is arranged in a series of side-by-side open loops circumferentially around the sleeve.

11. The jacket of claim 9 including: a thermal couple associated with the heating element to regulate the maximum temperature thereof.

12. The jacket of claim 9 wherein: said mounting ring menas base is comprised as a cylindrical rim embedded in and coaxial with the sleeve.

13. The jacket of claim 12 wherein: said rim has a diameter slightly larger than the diameter of the top wall of the filter element.

14. The jacket of claim 8 including: a bottom wall connected to the sleeve.

15. The jacket of claim 14 wherein: said bottom wall has a drainage opening.

16. The jacket of claim 8 wherein: said sleeve is cylindrical.

* * * * *